US012694234B2

(12) United States Patent
Umapathy et al.

(10) Patent No.: US 12,694,234 B2
(45) Date of Patent: Jul. 28, 2026

(54) IMAGE-BASED TEXT TRANSLATION AND PRESENTATION

(71) Applicant: Amazon Technologies, Inc., Seattle, WA (US)

(72) Inventors: Sujith Gunjur Umapathy, Berlin (DE); Nikhil Garg, Berlin (DE); John Mark Hubenthal, Seattle, WA (US); Jose Luis Baez, Fair Lawn, NJ (US); Pushpendu Ghosh, Vadodara (IN)

(73) Assignee: Amazon Technologies, Inc., Seattle, WA (US)

( * ) Notice: Subject to any disclaimer, the term of this patent is extended or adjusted under 35 U.S.C. 154(b) by 268 days.

(21) Appl. No.: 17/937,250

(22) Filed: Sep. 30, 2022

(65) Prior Publication Data

US 2024/0111968 A1 Apr. 4, 2024

(51) Int. Cl.
| | |
|---|---|
| *G06F 40/47* | (2020.01) |
| *G06F 40/109* | (2020.01) |
| *G06T 5/77* | (2024.01) |
| *G06V 10/22* | (2022.01) |
| *G06V 10/82* | (2022.01) |

(52) U.S. Cl.
CPC ............ *G06F 40/47* (2020.01); *G06F 40/109* (2020.01); *G06T 5/77* (2024.01); *G06V 10/225* (2022.01); *G06V 10/82* (2022.01)

(58) Field of Classification Search
CPC ........ G06T 5/77; G06V 10/225; G06V 10/82; G06V 30/413; G06V 30/10; G06Q 10/10; G06Q 50/10
See application file for complete search history.

(56) References Cited

U.S. PATENT DOCUMENTS

| | | | | |
|---|---|---|---|---|
| 8,588,528 | B2 * | 11/2013 | Chapman ............. | G06V 30/127 |
| | | | | 382/167 |
| 10,839,164 | B1 * | 11/2020 | Shorter ................. | G06F 40/253 |
| 2008/0300859 | A1 | 12/2008 | Chen et al. | |
| 2009/0234637 | A1 * | 9/2009 | Kato ....................... | G06F 40/53 |
| | | | | 382/185 |
| 2011/0164291 | A1 * | 7/2011 | Kutsumi ............... | G06F 40/169 |
| | | | | 358/464 |
| 2011/0202481 | A1 * | 8/2011 | Lang .................. | G06Q 30/0241 |
| | | | | 705/500 |
| 2012/0330646 | A1 | 12/2012 | Andrade et al. | |
| 2015/0134318 | A1 * | 5/2015 | Cuthbert ................. | G06F 40/58 |
| | | | | 715/231 |

(Continued)

OTHER PUBLICATIONS

International Search Report and Written Opinion received in PCT Application No. PCT/US2023/033535, dated Jan. 8, 2024 in 11 pages.

*Primary Examiner* — Jesse S Pullias
(74) *Attorney, Agent, or Firm* — Knobbe, Martens, Olson & Bear, LLP

(57) ABSTRACT

Systems and methods are provided for translation of text in an image, and presentation of a version of the image in which the translated text is displayed a manner consistent with the original image. Text segments are automatically translated from their original source language to a target language. In order to provide presentation of the translated text in a manner that closely matches the source text, various display attributes of the source text are detected (e.g., font size, font color, font style, etc.).

19 Claims, 5 Drawing Sheets

(56) References Cited

U.S. PATENT DOCUMENTS

| | | | |
|---|---|---|---|
| 2015/0370785 A1* | 12/2015 | Mauser ................. | G06V 20/20 |
| | | | 704/7 |
| 2016/0026859 A1* | 1/2016 | Chiba ................... | G06V 10/44 |
| | | | 382/199 |
| 2016/0357732 A1 | 12/2016 | Hsu et al. | |
| 2017/0255614 A1* | 9/2017 | Vukosavljevic ... | G06V 30/2445 |
| 2017/0293611 A1* | 10/2017 | Tu ....................... | G06F 16/9535 |
| 2018/0329890 A1* | 11/2018 | Ito ........................... | G06F 40/58 |
| 2020/0004815 A1* | 1/2020 | Weisberg .............. | G06N 5/046 |
| 2020/0026970 A1* | 1/2020 | Berseth ............. | G06V 30/2455 |
| 2020/0394431 A1* | 12/2020 | Ramachandra ......... | G06F 40/44 |
| 2021/0303905 A1* | 9/2021 | Baek ................. | G06F 18/23213 |
| 2023/0325613 A1* | 10/2023 | Ghatage ................. | G10L 15/26 |

* cited by examiner

IMAGE-BASED TEXT TRANSLATION AND PRESENTATION

BACKGROUND

Computing systems can utilize communication networks to exchange data. In some implementations, one computing system, sometimes referred to as a client, requests content over a communication network from another computing system, sometimes referred to as a server. For example, the content may include text-based portions, image-based portions, video-based portions, audio-based portions, other portions, or some combination thereof. The server may provide the requested content to the client over the communication network, and the client may present the content upon receipt.

BRIEF DESCRIPTION OF THE DRAWINGS

Embodiments of various inventive features will now be described with reference to the following drawings. Throughout the drawings, reference numbers may be reused to indicate correspondence between referenced elements. The drawings are provided to illustrate example embodiments described herein and are not intended to limit the scope of the disclosure. To easily identify the discussion of any particular element or act, the most significant digit(s) in a reference number typically refers to the figure number in which that element is first introduced.

DETAILED DESCRIPTION

Figure 1:
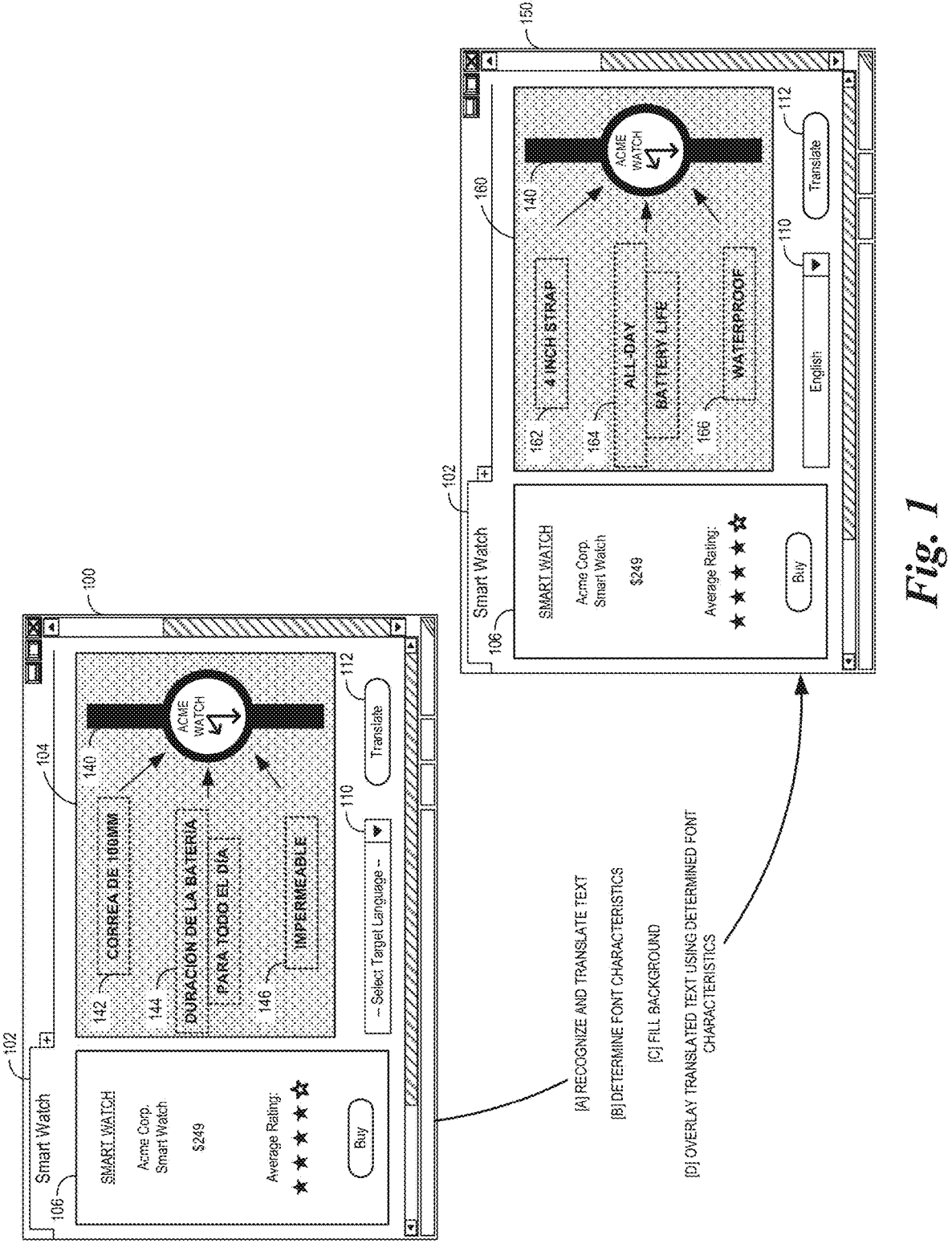
FIG. 1 is a diagram of illustrative user interfaces showing the effect of image-based text translation and presentation according to some embodiments.

The present disclosure relates to translation of text in an image or video, and presentation of a version of the image or video in which the translated text is displayed in a manner consistent with the original image or video.

Some conventional systems allow for automatic translation (e.g., "machine translation") of input from a source language to any of a variety of target languages. However, such systems require the input to be in the form of a series of textual characters (e.g., a "string" data type). Thus, such systems are unable to translate language that, although appearing as text to users, is encoded in other forms. For example, pixel-based formats include encoded image data for displaying images of objects. Many such images include text that is incidental to the depicted objects (e.g., text on signs, packages, etc.). Some images include text that is not merely incidental, but is instead the primary feature or one of the primary features of images. For example, "infographics" are images such as charts or diagrams that include presentation of textual information, often times in connection with non-textual items. Because the textual information is encoded in an image-based format in the same manner as information for presenting other visual features of the image (background, foreground objects, etc.), conventional translation systems are unable to translate the text in such images. Even if the text were to be extracted from encoded image data using optical character recognition ("OCR") first and then translated, the translated text would not be inserted back into the image in a way that matches the original display characteristics and replaces the source (untranslated) text.

Some aspects of the present disclosure address some or all of the issues noted above, among others, by automatically detecting display attributes of source text encoded in pixel-based formats with other image data. Translated versions of images may thus be generated in which the translated text is presented in a manner that is consistent with—and replaces—the source text in the original image.

In some embodiments, a font size of source text can be determined by analyzing a two-dimensional region of the image in which the source text is presented, and using the results of the analysis to determine the font size to be used for presenting translated text in the same region. For example, an image-based text translation and presentation system can determine the size of the region in one dimension (e.g., the "height" of the region in terms of a quantity of pixels) and determine the font size that most closely corresponds to the determined size. If there are multiple lines of text, the region may be split into subregions such that the determined height corresponds to a single line of text. Additionally, or alternatively, the system can determine the size of the region in a different dimension (e.g., the "width" in pixels), and determine a font size that will allow the translated text, which may have a greater or lesser number of characters than the source text, to be displayed in the region.

In some embodiments, a font color of source text can be determined by analyzing the colors appearing in a region in which the source text is presented, and using the results of the analysis to determine the font color to be used for presenting translated text in the same region. For example, an image-based text translation and presentation system can determine the color of each individual pixel in the region (or a subset thereof) and cluster the pixels by their colors. If two clusters are identified, it can be expected that one cluster corresponds to pixels of the text and the other cluster corresponds to pixels of the background. The background cluster may be identified by determining which cluster includes more pixels on the "border" of the region, and therefore the font cluster can be identified as the other cluster. The color of the font may then be determined as the predominant, average, weighted average, etc. of colors in the font cluster of pixels.

In some embodiments, a font style of source text can be determined by analyzing the source text in the image, and using results of the analysis to determine the font style (e.g., font family, font name, etc.) to be used for presenting translated text in the same region. For example, a machine learning model (e.g., a convolutional neural network or "CNN" image detection model) may be trained to classify images of text as one of a variety of different fonts. The translated text can then be formatted using the detected font style for display. As another example, a generative adversarial network or "GAN" can be used to identify the particular font style of source text and generate a version of an image or image data with target text formatted using the same (or a substantially similar) font style.

Additional aspects of the present disclosure relate to modifying an image such that source text is replaced by the background of the image, or an approximation thereof. In some embodiments, the background color in the region in which source text is presented may be determined, and the source text itself (or the entire region, or portions thereof) can be replaced using the background color. For example, the background color of the region may be determined as described above with respect to determining font color. The pixels associated with source text, or the entire region, may then be set to the background color prior to overlaying the translated text. In some embodiments, textures may be detected and used to replace source text instead of, or in addition to, using a single color.

Further embodiments of the present disclosure relate to use of image-based text translation features in an interactive network-based content delivery environment. In some embodiments, a server may provide a network resource (e.g., a web page) to a client in response to a request from the client. The network resource may include an image (or instructions to obtain an image), such as an infographic with source text in a source language. The network resource may further include an interactive control that a user can use to select a target language into which the source text is to be translated. In response to selection of a target language, the server can generate a translated version of the image with source text translated into the selected target language and presented using one or more characteristics of the font of the source text, as described above and in greater detail below. The server may return the translated image to the client, and the network resource may be configured to automatically swap display of the translated image for display of the source image.

Various aspects of the disclosure will be described with regard to certain examples and embodiments, which are intended to illustrate but not limit the disclosure. Although aspects of some embodiments described in the disclosure will focus, for the purpose of illustration, on particular examples of font attributes, pixel-based formats, and the like, the examples are illustrative only and are not intended to be limiting. In some embodiments, the techniques described herein may be applied to additional or alternative types of font attributes, pixel-based formats, and the like. Additionally, any feature used in any embodiment described herein may be used in any combination with any other feature or in any other embodiment, without limitation.

Example Image Translation

With reference to an illustrative example, FIG. 1 shows an interface 100 in which a network resource 102 is presented. The interface 100 may be presented by an application, such a browser application, executing on a computing device, such as a client computing device.

In some embodiments, the network resource 102 may be a web page, such as a page defined by a Hypertext Markup Language (HTML) file or stream. The network resource 102 may include instructions for presenting various content, including textual content, image content, interactive controls, etc. For example, as shown, presentation of the network resource 102 within the interface 100 may include an image 104, a text panel 106, a target language selection control 110, and a translation request control 112.

Although the examples of images with text to be translated as described herein are generally individual still images such as image 104, the examples are illustrative only and are not intended to be limiting, required, or exhaustive. In some embodiments, any image data encoded in a pixel-based format may be used, including images or videos (e.g., sets of images as frames to be evaluated and translated frame-by-frame). For example, the pixel-based format may be one of: bitmap; Joint Photographic Experts Group (JPEG); Portable Network Graphics (PNG); Tagged Image File Format (TIFF); various RAW image formats; Graphics Interchange Format (GIF); Motion Picture Experts Group (MPEG); MPEG-2; MPEG-4; Audio Video Interleave (AVI); or the like.

In the illustrated example, the image 104 is an infographic depicting an item 140 (e.g., a watch) and various source text regions 142, 144, and 146. The image data for image 104 is encoded in a pixel-based format. Thus, the text displayed in source text regions 142, 144, 146 is not included in the image data in character string form. Rather, the text in the source text regions 142, 144, 146 is encoded similarly to image data for the item 140 (e.g., a color data for individual pixels or subsets thereof).

In contrast, the text panel 106 may be encoded in character string form. For example, the text panel 106 may be defined by various HTML elements within the network resource 102, and the network resource 102 may be provided to an application (e.g., a browser application executing on a client device) in a text-based file format.

The example network resource 102 includes a target language selection control 110 that a user may use to select a target language in which to translate the image 104. For example, the target language selection control 110 may be a "drop-down" or HTML "select" control configured to allow selection from a predetermined or dynamically-determined list of target languages, such as English, Spanish, German, Japanese, etc. In some embodiments, the target language selection control 110 may be configured with a default selection based on the current user's geographic location or profile preference for a particular language.

The example network resource 102 also includes a translation request control 112. For example, the translation request control 112 may be a command button or link. Activation of the translation request control 112 can cause submission of a request (e.g., to the server from which the network resource 102 was received, or to another system) to receive a translated version of the image 104 in which text in the source text regions 142, 144, and 146 is translated into the target language selected in the target language selection control 110. In some embodiments, the request may be a request to translate all text presented by the network resource 102. For example, in addition to a translated version of the image 104, a translated version of text in text panel 106 may be requested and received.

Figure 2:
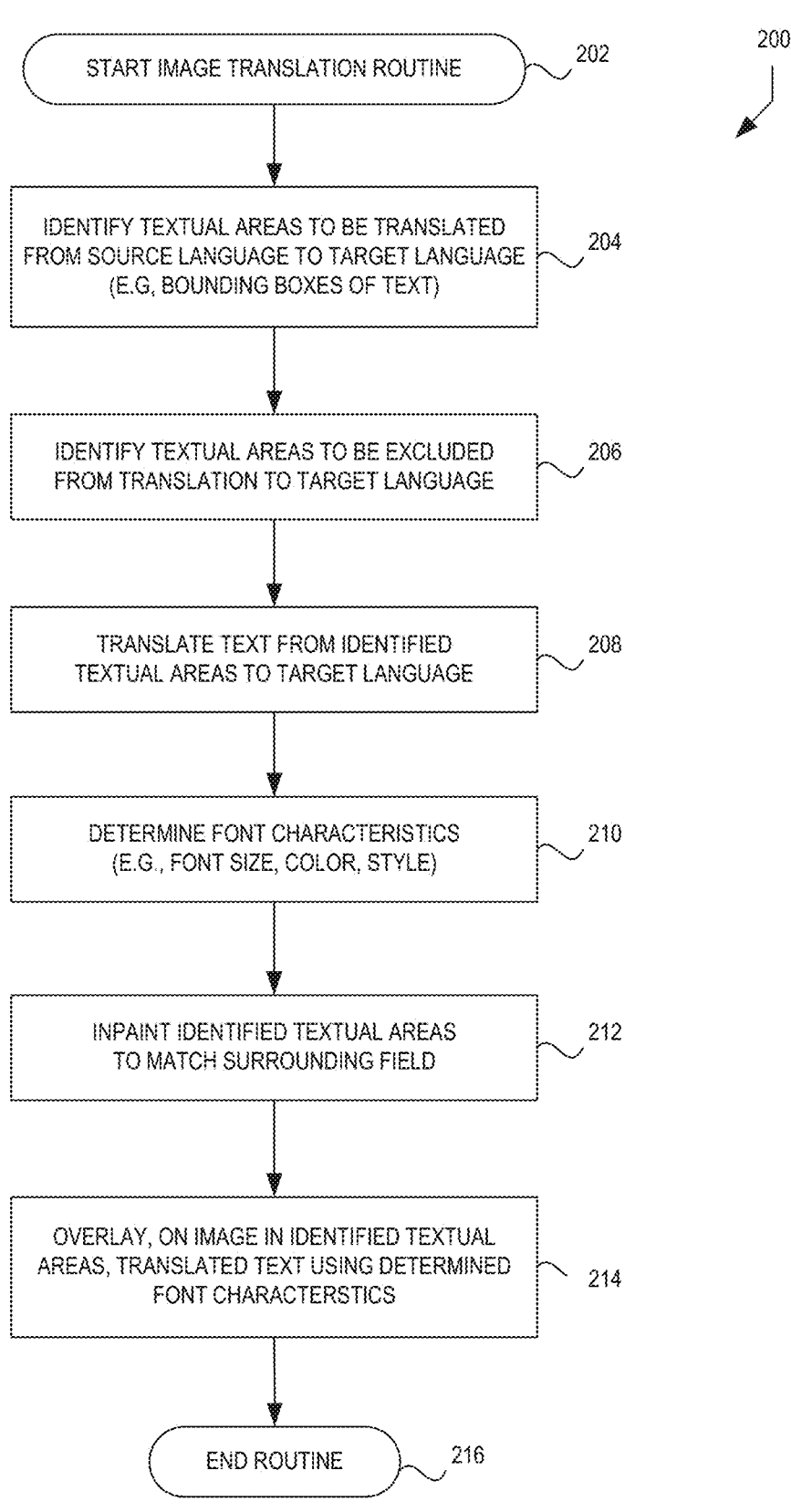
FIG. 2 is a flow diagram of an illustrative routine for translating image-based text and presenting the translated text using presentation attributes of the source text according to some embodiments.

In response to the request for the translated version of the image 104 (or translated version of the network resource text as a whole), a computing system may generate the translated version. For example, the request may be sent via a network from the computing device displaying the interface 100 (e.g., a client computing device) to the computing device that provided the network resource 102 (e.g., a server computing device), or to some other computing system (e.g., an image-based translation and presentation system). The recipient of the request-referred to herein simply as the "server" or "system" for brevity—may then generate the translated version of the image 104 and provide it back to the client for presentation. A detailed routine for image-based text translation and presentation is shown in FIG. 2 and described in greater detail below.

In some embodiments, as shown in FIG. 1, the system may recognize source text regions 142, 144, and 146 and automatically translate the text into the target language at [A]. For example, the system may translate "CORREA DE 100 MM," "DURACIÓN DE LA BATERÍA PARA TODO EL DÍA," and "IMPERMEABLE" in Spanish to "4 INCH STRAP," "ALL-DAY BATTERY LIFE," and "WATER-PROOF," respectively, in English. In some embodiments, in addition to language-based translation of the words, the system may convert units as in the case of "100 MM" to "4 INCH."

In some embodiments, certain text may be excluded from the translation process. For example, text that is part of a displayed item, such as the logo "ACME WATCH" in item 140, may be excluded from translation. This may be done for a variety of reasons, such as to ensure that objects remain displayed as they are expected to appear as physical objects outside of an image. In some embodiments, text that is sensitive may also or alternatively be excluded from translation. For example, medical information, religious information, personal information, and other information for which errors in the automated translation process can have serious real-world consequences may be excluded from automatic translation even when such text appears in an image separately from an item.

Although the example shown in FIG. 1 includes text of a single source language being translated to a target language, the example is provided for purposes of illustration only, and is not intended to be limiting. In some embodiments, text of multiple different source languages may be translated to a target language. For example, the text of source text region 142 may be Spanish, while the text of source text region 144 may be German and the text of source text region 146 may be Russian. In this case, the system may recognize each source language separately (e.g., serially or in parallel) and use an appropriate translation unit to translate the text to target language.

The system may determine one or more display attributes for display of the target text at [B]. For example, the server may determine the font size, color, style, other attributes, or some combination thereof.

The system may determine one or more display attributes of the background of the image, and replace the source text in source text regions 142, 144, 146 with the color, texture, or imagery of the background at [C]. In this way, when the translated text is overlaid in the same locations as the source text (e.g., source text regions 142, 144, 146), the background of the translated text will match or closely approximate the surrounding background, rather than overlaying translated text on top of the source text.

At [D] the system may generate translated text using the display attributes determined from the source text (e.g., font characteristics), and overlay the text onto the image to produce a translated image 160. As shown in interface 150, the translated text regions 162, 164, and 166 are in the same relative locations as the source text regions 142, 144, 146, respectively, were previously located. Moreover, the text in the translated text regions 162, 164, and 166 is presented in the same, or substantially similar, font size, color, and style as the source text in the source text regions 142, 144, 146, respectively. However, the item 140 has remained unchanged.

Example Image-Based Text Translation Routine

FIG. 2 illustrates example routine 200 for image-based text translation. The routine 200 begins at block 202. The routine 200 may begin in response to an event, such as receipt by an image-based text translation system of a translation request to translate an image. For example, a client device may submit a translation request including or referencing an image to be translated (e.g., by file name, network address, or another identifier). The request may further include or reference the target language to which text in the image is to be translated (e.g., by language name, identifier, etc.).

Figure 5:
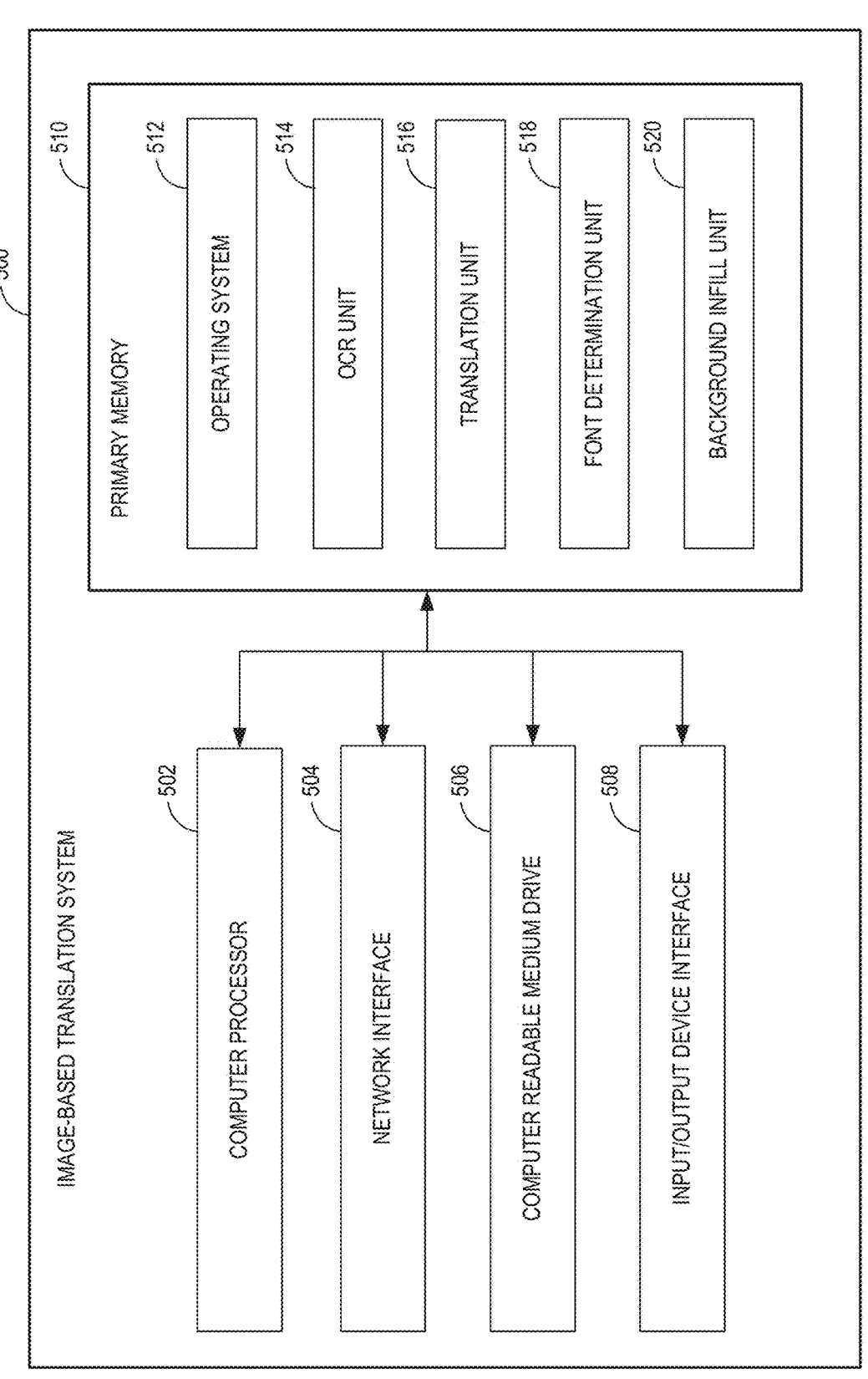
FIG. 5 is a block diagram of an illustrative computing system configured to provide image-based text translation according to some embodiments.

When the routine 200 is initiated, a set of executable program instructions stored on one or more non-transitory computer-readable media (e.g., hard drive, flash memory, removable media, etc.) may be loaded into memory (e.g., random access memory or RAM) of an image-based translation system, such as the image-based translation system 500 shown in FIG. 5, and executed by one or more processors. In some embodiments, the routine 200 or portions thereof may be implemented on multiple processors, serially or in parallel.

At block 204, the image-based translation system 500 can identify textual areas in the image to be translated from the source language to the target language. For example, to identify textual areas in the image, the system 500 may perform optical character recognition ("OCR") on the image or portions thereof.

In one specific non-limiting embodiment, the system 500 may pre-process the image to binarize the image data (e.g., covert pixels from color or grayscale to black and white), identify two-dimensional regions in which text is likely to be present, and segment the text into individual characters or subsets thereof. The system 500 may produce a ranked candidate list of characters from the segments (e.g., using matrix matching or feature extraction). The system 500 may then post-process the data using a lexicon for the source language to produce plain text for each region in which text is identified. In some embodiments, the system 500 may apply merging rules to determine which characters or words are to be considered together as a single unit (e.g., a sentence), and when they are to be considered different units. In addition, the system 500 can generate a "bounding box" defining each two-dimensional region. If a single unit of text is split across two lines, a different bounding box may define each subregion of the single text unit. For example, a bounding box may be defined by a set of four coordinates for four vertices of a rectangle within which text is located, or two coordinates (e.g., for the top-left and bottom-right vertices of a bounding box). The bounding box may be defined so as to include or border the outer-most pixel of text within the bounding box. Alternatively, the bounding box may be defined to include a buffer (e.g., one or more pixels of padding between the outermost pixel of text within the bounding box, and the bounding box boundary itself).

In the image 104 shown in FIG. 1, the system 500 can identify source text regions 142, 144, 146. Source text region 144 includes two bounding boxes because the text is separated onto two lines. However, application of merging rules has allowed the system 500 to determine that the two lines are to be considered together as a single unit of text (phrase or sentence) for translation purposes.

The example methods of identifying textual areas in image data encoded in pixel-based formats are illustrative only, and are not intended to be limiting, required, or exhaustive. In some embodiments, additional or alternative methods may be used to identify regions of text, the text presented in the regions, the location of the regions within the image, and the like.

At block 206, the image-based translation system 500 can in some embodiments identify textual areas that are to be excluded from translation. For example, the item 140 in the image 104 includes text (the logo "ACME WATCH") that is not indicated as a source text region. This text may be excluded out of a desire to avoid altering the display of physical items (e.g., products, packaging, etc.). Other types of text for which it may be desirable to avoid translation may include text conveying sensitive information, such as medical information for which errors in automated translation can be particularly problematic.

To implement exclusion of certain text from translation, the system 500 may be configured to recognize the presence of such text during the OCR process, and exclude the bounding boxes/text from OCR output. Alternatively, the system 500 may be configured to exclude OCR output for certain text from further processing (translation, replacement, etc.).

In some embodiments, the system 500 may use a model to recognize text to be excluded (e.g., a machine learning model trained using logos, sensitive information, objects displaying non-logo text, etc.). In some embodiments, the system 500 may use a database of logos against which images are compared to identify regions including logos not to be translated. In some embodiments, the system 500 may use a model to recognize objects in an image (e.g., a machine learning model training using images of objects), and may exclude text from image regions in which objects are present.

At block 208, the image-based translation system 500 can translate source text in the source language to target text in a target language. In some embodiments, the source language may be detected during an OCR process, specified as part of the translation request, or determined in a separate subroutine (e.g., using a language detection model trained to classify text as a source language). The target language may be specified as part of the translation request, or determined based on geographic location within which the image is being viewed, a preferred language of a user submitting the translation request, or the like. Once the source and target languages are identified and the source text has been extracted from the image, the system 500 can perform automatic translation (e.g., "machine translation") on the source text to obtain, as target text, a version of the source text translated to the target language. For example, the system 500 may use an encoder/decoder-based system with long short-term memory (LSTM) and/or attention layers.

At block 210, the image-based translation system 500 can determine one or more display attributes of the source text in the image, such as one or more font characteristics.

In some embodiments, a font size of source text can be determined by analyzing a bounding box or otherwise analyzing the two-dimensional region in which a unit of source text is presented. For example, the system can determine the size of the region in one dimension (e.g., the "height" of the region) in terms of a quantity of image units (e.g., pixels). If a bounding box encompasses multiple lines of text, the bounding box may be split into two or more sub-boxes such that the determined height corresponds to a single line of text. The process may be repeated for each region of the image in which translatable text was detected. A conversion factor may be applied to the size(s) in order to generate the font size to be used for the target text to be displayed in each region.

Figure 3:
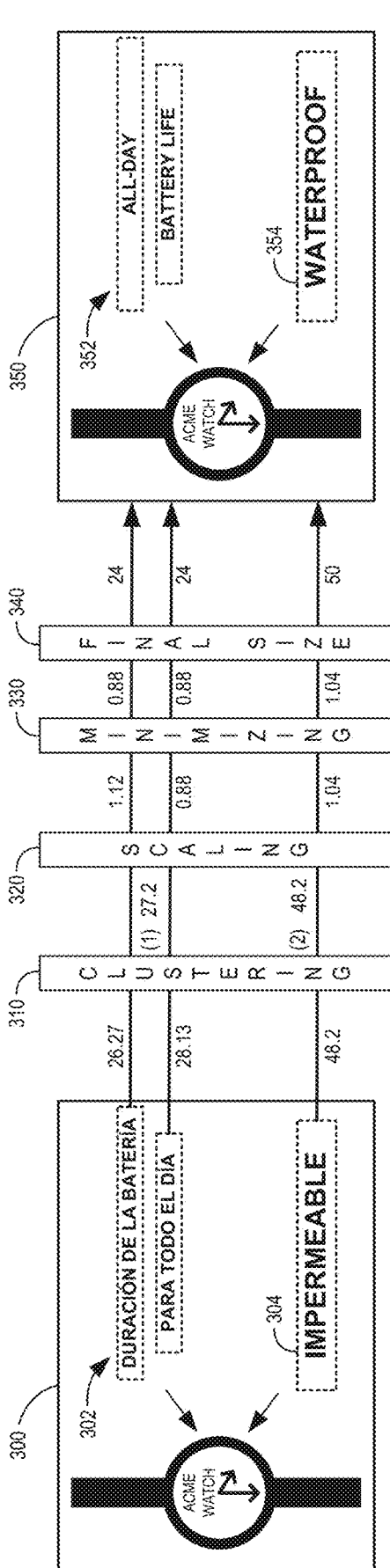
FIG. 3 is a block diagram of illustrative data flows that may occur when determining certain presentation attributes according to some embodiments.

In some embodiments, to standardize the font size for similarly-sized units of source text and source text regions, the system 500 may use a clustering process. FIG. 3 illustrates one example of such as clustering process performed for an image 300 that is a simplified version of image 104, altered for ease of description. As shown, a first source text region 302 includes two bounding boxes for two lines of times, while a second source text region 304 includes a single bounding box. The size of the font in the first source text region 302 is noticeably smaller than the size of the font in the second source text region 304. Accordingly, the size of the two bounding boxes in the first source text region 302 are 26.27 and 28.13 units, respectively, while the size of the bounding box in the second source text region 304 is 48.2 units (where units are defined in terms of pixels, for example).

The system 500 may perform a clustering operation 310 (e.g., DBSCAN clustering, k-means clustering, etc.) and determine that the two bounding boxes in first source text region 304 are to be clustered together, while the bounding box in the second source text region 304 is in a separate cluster. The centroid size for each cluster may be used to determine a size for each cluster, or the sizes of each bounding box in each cluster may be averaged to determine a size for each cluster. In the illustrated example, the sizes are 27.2 for cluster (1), and 50.1 for cluster (2).

The system 500 may perform a scaling operation 320 to scale the sizes for each bounding box based on an analysis of the quantity of source text characters for the bounding box with respect to quantity of target text characters for the bounding box. This can be done to account for differences in length of source text and corresponding translated text. For example, if the translated text has more characters than the source text, the font size to be used to fit the translated text within the same bounding box may be smaller than the font size of the source text. Thus, a particular scaling factor (e.g., a scaling factor <1.0) may be applied to the font size. Similarly, if the translated text has fewer characters than the source text, the font size to be used to fit the translated text within the same bounding box may be larger than the font size of the source text. Thus, a particular scaling factor (e.g., a scaling factor >1.0) may be applied to the font size.

The system 500 may perform a minimizing operation 330 to select the smallest scaling factor for each cluster. This may be done to ensure that the target text does not exceed the size of the corresponding bounding box for any target text in the translated version of the image. In the illustrated example, the scaling factor of 0.88 is chosen for cluster (1), and the scaling factor of 1.04 is chosen for cluster (2).

The system 500 may perform a final font size operation 340 to determine a final font size for each cluster using the minimum scaling factor and determined font size for each cluster. The final font size may then be used for presentation of target text within the same regions as the source text. In the illustrated example, the final font size of 24 for cluster (1) may be determined by applying scaling factor 0.88 to size measurement 27.2. Final font size of 50 for cluster (2) may be determined by applying scaling factor 1.04 to size measurement 48.2.

As shown in FIG. 3, a translated image 350 includes English-translated target text for the original Spanish source text from image 300. First target text region 352 reads "ALL-DAY BATTERY LIFE," the English translation of the first source text region 302, and presents the target text using a font size of 24. Second target text region 354 reads "WATERPROOF," the English translation of the second source text region 304, and presents the target text using a font size of 50.

In some embodiments, a font color of source text can be determined by analyzing the colors appearing in a bounding box or otherwise in the two-dimensional region in which a unit of source text is presented. For example, the system can determine the color of each individual pixel in the region (or a subset thereof, such as a statistically significant sample) and cluster the pixels by their colors. If two clusters are identified, it can be expected that one cluster corresponds to pixels of the source text and the other cluster corresponds to pixels of the background. The background cluster may be identified by determining which cluster includes more pixels on the "border" of the region, and therefore the font cluster can be identified as the other cluster. The color of the font may then be determined as the predominant, average, weighted average, etc. of colors in the font cluster of pixels.

Figure 4:
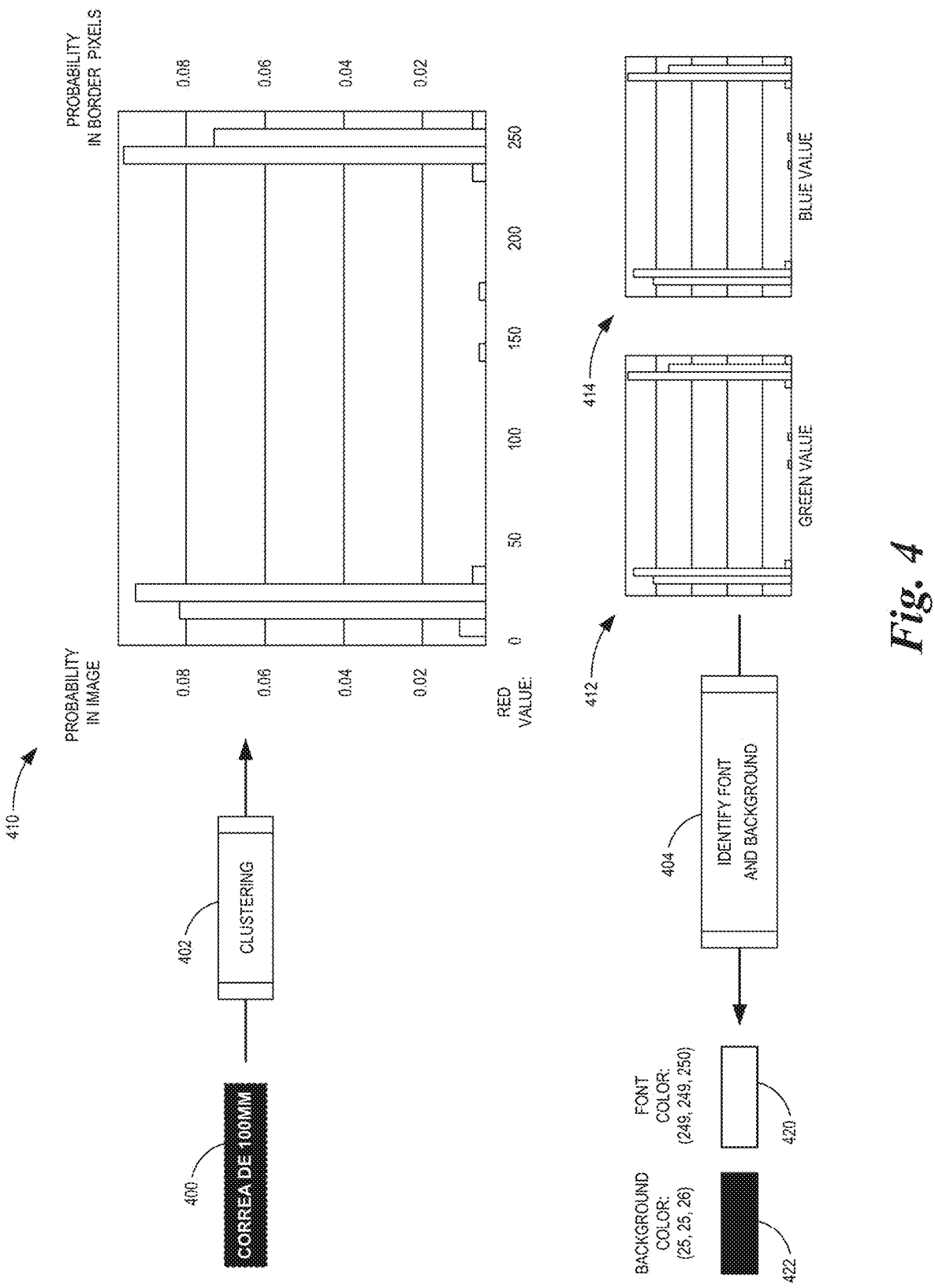
FIG. 4 is a block diagram of illustrative data flows that may occur when determining certain presentation attributes according to some embodiments.

FIG. 4 illustrates one example of as clustering process performed for source text region 400 defined by a bounding box. As shown, the source text region 400 includes text in a white font color, and background in a uniform black color (e.g., no texture, images, etc.). To programmatically determine the color properties of the text and background from image data encoded in a pixel-based format, the system 500 may perform a clustering operation 402. For example, the system 500 may determine the color of each pixel in the sample, and then perform k-means clustering, DBSCAN clustering, or some other clustering operation to determine two (or more) clusters, one of which is a presumably a cluster of pixels from the source text, and another of which is presumably a cluster of pixels from the background.

In some embodiments, as shown, a histogram of color components may be generated from the pixels in the sample. For example, in the pixel-based format in which the image data is encoded, colors may be encoded as RGB (red, green blue) triplets for each pixel. In an RGB triplet, there is a number from 0-255 for each of a red component (or channel), green component (or channel), and blue component (or channel), where 0 indicates a component does not contribute to the pixel color at all (such that 0, 0, 0 is black) and 255 indicates a component contributes its maximum hue to the pixel (such that 255, 255, 255 is white). By generating a histogram for each of the component colors—red histogram 410, green histogram 412, and blue histogram 414—the system 500 can identify clusters within each component color. Once clusters within each component are determined, a representative value for the cluster can be generated (e.g., an average, centroid, etc.).

The system 500 can perform a font and background identification operation 404 using the clustered color values to determine a color corresponding to the font of the source text and a color corresponding to a background of the source text region 400. In some embodiments, the background color may be identified by determining which color cluster includes more pixels on the "border" of the source text region 400. Typically, it can be expected that the majority of pixels on the border are background pixels (or at least not font pixels), particularly when the bounding box defining source text region 400 is padded by one or more pixels, or when one or more pixels outside of and adjacent to the border are evaluated. For example, the color of the border pixels may be averaged, and whichever cluster is closest to the average (e.g., as determined using L2 distance or another measure of similarity) may be identified as the background cluster, leaving the other cluster as the font cluster. In the illustrated example, the background color 422 is determined to be substantially black (defined by RGB triplet 25, 25, 26), while the font color 420 is determined to be substantially white (defined by RGB triplet 249, 249, 250).

In some embodiments, a font style of source text can be determined by analyzing the source text in the image, and using results of the analysis to determine the font style (e.g., font family, font name, etc.) to be used for presenting translated text in the same region. For example, a machine learning model (e.g., a convolutional neural network or "CNN" image detection model) may be trained to classify images of text as one of a variety of different fonts. The translated text can then be formatted using the detected font style for display. As another example, a generative adversarial network or "GAN" can be used to identify the particular font style of source text and generate a version of an image or image data with target text formatted using the same (or a substantially similar) font style.

At block 212, the image-based translation system 500 can in-paint source text to match (or closely approximate) the background within the source text region. This can be done so that when target text is added to the region, the remnants of the source text are no longer visible and it will appear to users as though the target text is the only text to have been placed in the region.

In some embodiments, the image-based translation system 500 may use a machine learning model configured to apply semantic segmentation to classify individual pixels or sets thereof as being text, background, or the like. For example, the machine learning model may be implemented using an encoder decoder architecture (e.g., UNET), and may be trained to identify strokes of text (e.g., straight lines, curves, etc.) as distinct from background or other foreground objects. The output of the semantic segmentation process may be—or be used to derive—a mask or other map of which pixels in the image data are text. The derived stroke mask can then be used for two purposes: (1) to identify the font color, and (2) to determine which pixels of the image to in-paint.

In some embodiments, the background color in the region in which source text is presented may be determined, and the source text itself (or the entire region, or portions thereof) can be replaced using the background color. For example, as shown in FIG. 4, background color 422 may be determined for source text region 400. The pixels associated with source text—identified as being part of the font color cluster as described above—can then be modified to present the background color. Alternatively, all or substantially all of the source text region 400 may be set to present the background color prior to overlaying the translated text.

In some embodiments, textures may be detected and used to replace source text instead of, or in addition to, using a single color. For example, object removal methods typically used to remove objects from images and replace the objects with non-uniform backgrounds (e.g., scenery) may be used in a similar manner to replace source text in a source text region. As another example, the image-based translation system 500 may use a machine learning model implemented using an encoder-decoder architecture, such as UNET. In this example, the input is (1) the original image (or just a text patch) and (2) (optional) a detected stroke mask. The output is the generated image where all the text stroke pixels have been filled with the background color or texture.

At block 214, the image-based translation system 500 can overlay or otherwise add target text to the image using the display attributes determined from the source text font. In some embodiments, the system 500 may generate target text using one or more font characteristics as determined above, combine the generated target text with the modified image (e.g., the original image in which the source text has been removed or obscured), and encode the resulting combination in the same pixel-based format as the original image. For example, the system 500 may rasterize the combination of the modified image and target text to convert the combination image data defining the color of the pixels to be presented.

The routine 200 may terminate at block 216. In some embodiments, the routine 200 may terminate after sending the translated image encoded in the pixel-based format to the client device from which the translation request was previously received. The client device may be configured (e.g., by an instruction or subroutine in a network resource) to swap out display of the original image for display of the translated image received from the system 500.

Execution Environment

FIG. 5 illustrates various components of an example image-based translation system 500 configured to implement various functionality described herein.

In some embodiments, the image-based translation system 500 may be implemented using any of a variety of computing devices, such as server computing devices, desktop computing devices, personal computing devices, mobile computing devices, mainframe computing devices, midrange computing devices, host computing devices, or some combination thereof.

In some embodiments, the features and services provided by the image-based translation system 500 may be implemented as web services consumable via one or more communication networks. In further embodiments, the image-based translation system 500 is provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

In some embodiments, as shown, an image-based translation system 500 may include: one or more computer processors 502, such as physical central processing units ("CPUs"); one or more network interfaces 504, such as a network interface cards ("NICs"); one or more computer readable medium drives 506, such as a high density disk ("HDDs"), solid state drives ("SSDs"), flash drives, and/or other persistent non-transitory computer readable media; one or more input/output device interfaces; and one or more computer-readable memories 510, such as random access memory ("RAM") and/or other volatile non-transitory computer readable media.

The computer-readable memory 510 may include computer program instructions that one or more computer processors 502 execute and/or data that the one or more computer processors 502 use in order to implement one or more embodiments. For example, the computer-readable memory 510 can store an operating system 512 to provide general administration of the image-based translation system 500. As another example, the computer readable memory 510 can store an optical character recognition ("OCR") unit 514 for recognizing segments of an image that include text, and extracting the text from those segments. As another example, the computer-readable memory 510 can store a translation unit 516 for translating source text in a source language to target text in a target language. As another example, the computer-readable memory 510 can store a font determination unit 518 for determining one or more display attributes of the source text, such as font size, color, style, etc. As another example, the computer-readable memory 510 can store a background infill unit 520 for determining one or more display attributes of background near source text, and filling in regions of source text using the background display attributes.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design conditions imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:

an image data store storing a plurality of image files, wherein an image file of the plurality of image files comprises image data, encoded in a pixel-based format, representing an image; and a server comprising computer-readable memory and one or more processors, wherein the server is configured to:

send a network resource to a client device, wherein the network resource comprises an instruction to display the image based on the image file;

receive, from the client device, a request for a translated version of the image, wherein the request is associated with a target language;

identify first source text in a first portion of image data, wherein the first source text is in a source language, wherein the first portion of image data represents a first two-dimensional region of the image, and wherein the first source text describes a product in a second portion of image data representing a second two-dimensional region of the image;

identify second source text, in the second portion of the image data, to be excluded from translation based on the second source text being located on the product;

translate the first source text to target text in the target language;

determine a font color in which the target text is to be displayed in the translated version, wherein the font color is determined based on color of a first subset of pixels of the image data, the first subset of pixels associated with the first source text;

determine a font size in which the target text is to be displayed in the translated version, wherein the font size is determined based on (a) first quantity of pixels in a first dimension of the first two-dimensional region, (b) a second quantity of pixels in a second dimension of the first two-dimensional region, and (c) a quantity of characters in the target text;

determine a background color of the image based on a clustering of color values associated with a second subset of pixels in a background of the image;

generate translated image data encoded in the pixel-based format, wherein the translated image data represents modified version of the first two-dimensional region comprising the target text formatted for display using the font color and the font size, and wherein a portion of the modified version of the first two-dimensional region comprises the background color of the image in place of at least a portion of the first source text; and send the translated image data to the client device.

2. The system of claim 1, wherein the network resource comprises a second instruction to display the translated version of the image using the translated image data.

3. The system of claim 1, wherein to identify the first source text, the server is configured to:

perform optical character recognition on the image data to generate a plurality of text segments, wherein a first text segment comprises:

a first text string within a first subregion of the first two-dimensional region of the image, the first subregion defined by a first set of coordinates; and a second text string with a second subregion of the first two-dimensional region of the image, the second subregion defined by a second set of coordinates; and determine that the first source text comprises the first text string and the second text string.

4. The system of claim 1, wherein the server is further configured to convert a portion of the first source text associated with a first unit of measure to a portion of the target text associated with a second unit of measure.

5. A computer-implemented method comprising:

under control of a computing system comprising one or more computer processors configured to execute specific instructions, identifying first source text in a first portion of image data, wherein the image data is encoded in a pixel-based format, and wherein the first portion of image data represents a first region of an image;

identifying second source text, in a second portion of the image data, to be excluded from translation, wherein the second portion of the image data represents a second region of the image, and wherein the second source text is to be excluded based on a product being recognized in the second region of the image;

translating the first source text in a source language to target text in a target language;

determining, based at least partly on the first portion of the image data, one or more display attributes for display of the target text;

determining a background color of the first region of the image based on a clustering of color values associated with pixels in a background of the first region of the image; and generating modified image data encoded in the pixel-based format, wherein a portion of the modified image data represents a modified version of the first region of the image comprising the target text formatted for display using the one or more display attributes, and wherein generating the modified image data comprises replacing a font pixel, associated with the first source text in the first region of the image, with a background pixel of the background color.

6. The computer-implemented method of claim 5, wherein identifying the first source text comprises:

performing optical character recognition on the image data to generate a plurality of text segments, wherein a first text segment comprises:

a first text string within a first subregion of the first region of the image, the first subregion defined by a first set of coordinates; and a second text string with a second subregion of the first region of the image, the second subregion defined by a second set of coordinates; and determining that the first source text comprises the first text string and the second text string.

7. The computer-implemented method of claim 5, further comprising:

causing display of a network resource comprising the image and a target language selection control; and receiving input data representing selection, using the target language selection control, of the target language from a plurality of target languages.

8. The computer-implemented method of claim 5, wherein translating the first source text further comprising converting a portion of the first source text associated with a first unit of measure to a portion of the target text associated with a second unit of measure.

9. The computer-implemented method of claim 5, wherein determining the one or more display attributes comprises:

determining a first quantity of pixels in a first dimension of a two-dimensional box within which at least a portion of the first source text is identified; and determining a font size at which the target text is to be displayed based at least partly on the first quantity of pixels.

10. The computer-implemented method of claim 9, wherein determining the one or more display attributes further comprises:

determining a second quantity of pixels in a second dimension of the two-dimensional box; and determining a quantity of characters in the target text, wherein the font size is determined based at least partly on the quantity of characters, the first quantity of pixels, and the second quantity of pixels.

11. The computer-implemented method of claim 5, wherein determining the one or more display attributes comprises:

determining a first color of a first subset of pixels in the first region of the image, wherein the first subset of pixels is associated with display of the first source text; and determining a font color in which the target text is to be displayed based at least partly on the first color.

12. The computer-implemented method of claim 5, wherein determining the one or more display attributes comprises determining a font style in which the first source text is presented, wherein the target text is to be displayed based at least partly on the font style.

13. The computer-implemented method of claim 5, further comprising:

sending a network resource to a computing device, wherein the network resource comprises an instruction to display the image based on the image data;

sending the image data to the computing device;

receiving a request for the modified image data; and sending the modified image data to the computing device, wherein the network resource comprises a further instruction to replace display of the image based on the modified image data.

14. A system comprising computer readable memory and one or more processors, wherein the system is configured to:

identify first source text in a first portion of image data, wherein the image data is encoded in a pixel-based format, and wherein the first portion of image data represents a first region of an image;

identify second source text, in a second portion of the image data, to be excluded from translation, wherein the second portion of the image data represents a second region of the image, and wherein the second source text is to be excluded based on a product being recognized in the second region of the image;

translate the first source text in a source language to target text in a target language;

determine, based at least partly on the first portion of the image data, one or more display attributes for display of the target text;

determine a background color of the first region of the image based on a clustering of color values associated with pixels in a background of the first region of the image; and generate modified image data encoded in the pixel-based format, wherein a portion of the modified image data represents a modified version of the first region of the image comprising the target text formatted for display using the one or more display attributes, and wherein generating the modified image data comprises replacing a font pixel, associated with the first source text in the first region of the image, with a background pixel of the background color.

15. The system of claim 14, wherein to determine the one or more display attributes, the system is further configured to:

determine a first quantity of pixels in a first dimension of a two-dimensional box within which at least a portion of the first source text is identified; and determine a font size at which the target text is to be displayed based at least partly on the first quantity of pixels.

16. The system of claim 14, wherein to determine the one or more display attributes, the system is further configured to:

determine a first color of a first subset of pixels in the first region of the image, wherein the first subset of pixels is associated with display of the first source text; and determine a font color in which the target text is to be displayed based at least partly on the first color.

17. The system of claim 14, wherein to determine the one or more display attributes, the system is further configured to determine a font style in which the first source text is presented, wherein the target text is to be displayed based at least partly on the font style.

18. The system of claim 14, wherein the one or more processors are further configured to:

identify one or more strokes of text as distinct from the background or a foreground object; and based on the one or more strokes of text, generate a map of which pixels in the image data are associated with the first source text.

19. The system of claim 18, wherein the one or more processors are further configured to determine the font pixel to be replaced based on the map.

\* \* \* \* \*